Apr. 10, 1923.  
R. S. BUSBY  
1,451,458  
TILTING AND LOCKING DEVICE FOR STEERING WHEELS  
Filed Jan. 13, 1921  
3 sheets-sheet 1

Inventor  
Robert S. Busby  
By  
Attorneys

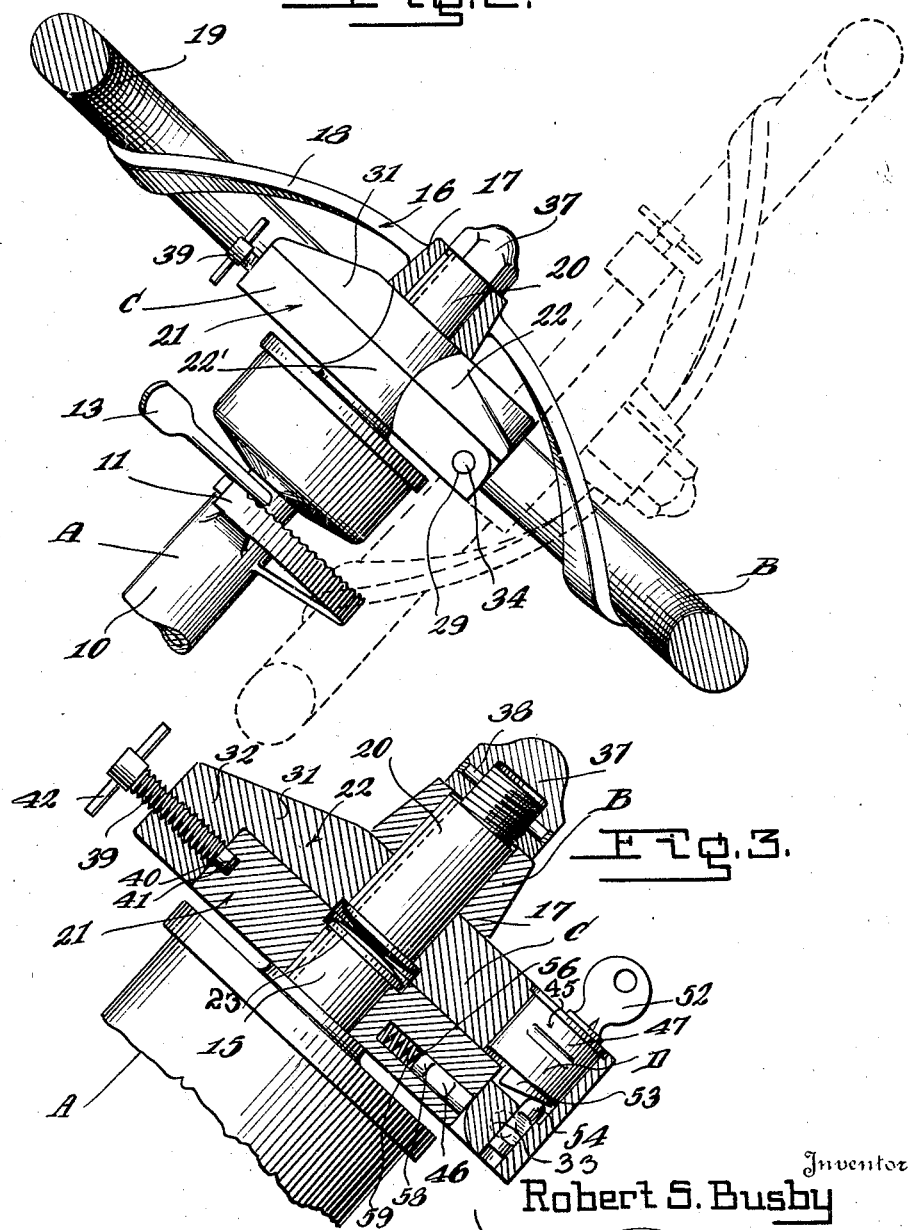

Apr. 10, 1923.
R. S. BUSBY
1,451,458
TILTING AND LOCKING DEVICE FOR STEERING WHEELS
Filed Jan. 13, 1921    3 sheets-sheet 3
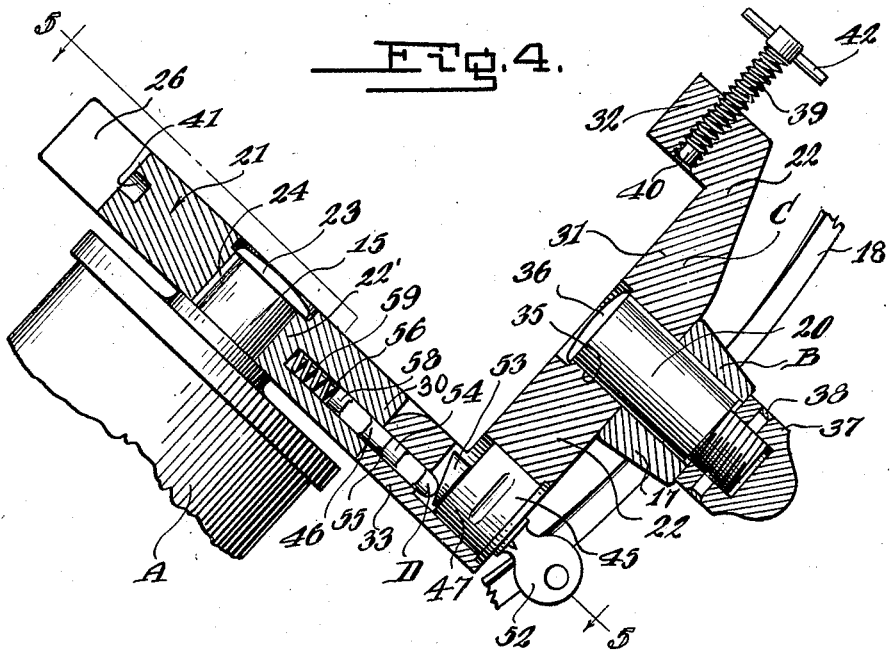
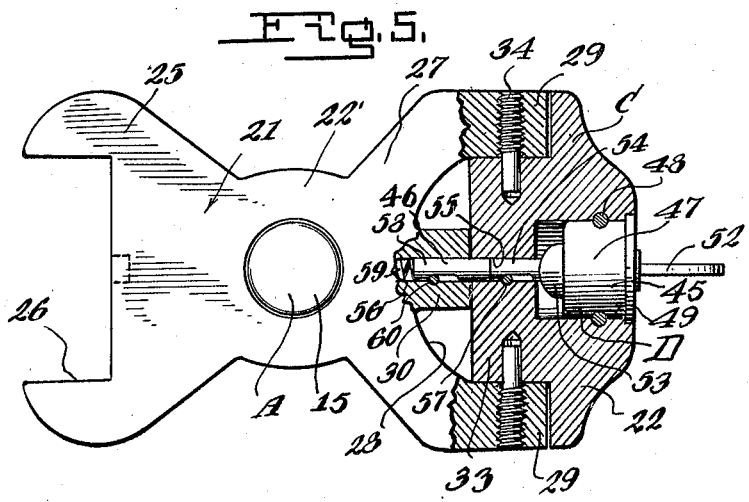
Inventor
Robert S. Busby
By Lancaster & Allwine
Attorney Patented Apr. 10, 1923.

1,451,458

UNITED STATES PATENT OFFICE.

ROBERT S. BUSBY, OF JACKSONVILLE, FLORIDA, ASSIGNOR OF ONE-HALF TO A. D. RICHARDSON AND R. O. BIRCHY, BOTH OF JACKSONVILLE, FLORIDA.

TILTING AND LOCKING DEVICE FOR STEERING WHEELS.

Application filed January 13, 1921. Serial No. 436,991.

*To all whom it may concern:*

Be it known that I, ROBERT S. BUSBY, a citizen of the United States, residing at Jacksonville, in the county of Duval and State of Florida, have invented certain new and useful Improvements in Tilting and Locking Devices for Steering Wheels, of which the following is a specification.

This invention relates to steering gear attachments for vehicles, and the primary objects of the present invention are to provide in an improved steering gear attachment, means for permitting the steering wheel to be swung to a position out of the way of the driver of the vehicle to facilitate the driver's entrance and exit to and from the vehicle; means for locking the wheel in this position, and means for preventing the steering of the vehicle and the operation of the throttle and spark levers, when the wheel is in the said position, whereby use of vehicles equipped with the attachment by unauthorized persons can be prevented.

A further object of the invention is to provide an improved attachment for motor vehicles embodying a pair of hingedly connected plates or castings, one of the plates or castings being secured to the steering shaft or post, and the other plate or casting being secured to the usual steering wheel, the castings being so arranged in relation to each other that the steering wheel can be tilted into engagement with the steering post and with the spark and throttle lever quadrants, so that movement of the steering wheel in relation to the quadrants is prevented, the attachment including means for locking the steering wheel into engagement with the quadrants and steering column, whereby unauthorized persons will be prevented from operating the attachment, and the consequent operation of the vehicle.

A further object of the invention is to provide a novel means for locking the plates or castings of the attachment at right angles to each other, so that the plates or castings cannot be swung to their operative abutting positions.

A still further object of the invention is to provide an improved steering gear attachment of the above character, which is durable and efficient in use, one that is simple and easy to manufacture, and one which can be placed upon the market and associated with the usual steering gear at a minimum cost.

With these and other objects in view, the invention consists in the novel construction, arrangement and formation of parts, as will be hereinafter more specifically described, claimed and illustrated in the accompanying drawings, forming a part of this specification, in which drawings:

Figure 2 is a side elevation of a steering column showing the improved attachment applied thereto, the steering wheel being shown in section, the steering wheel being shown in full lines in its normal position, and in dotted lines in its inoperative position.

Figure 3 is a detail section taken on the line 3—3 of Figure 1.

Figure 4 is a section similar to Figure 3 with the outer plate or casting in its raised position, and locked against movement.

Figure 5 is a detail section taken on the line 5—5 of Figure 4.

Referring to the drawings in detail, wherein similar reference characters designate corresponding parts throughout the several views, the letter A indicates a steering column; B, a steering wheel; and C, the improved attachment for connecting the steering column and wheel together.

Figure 1:
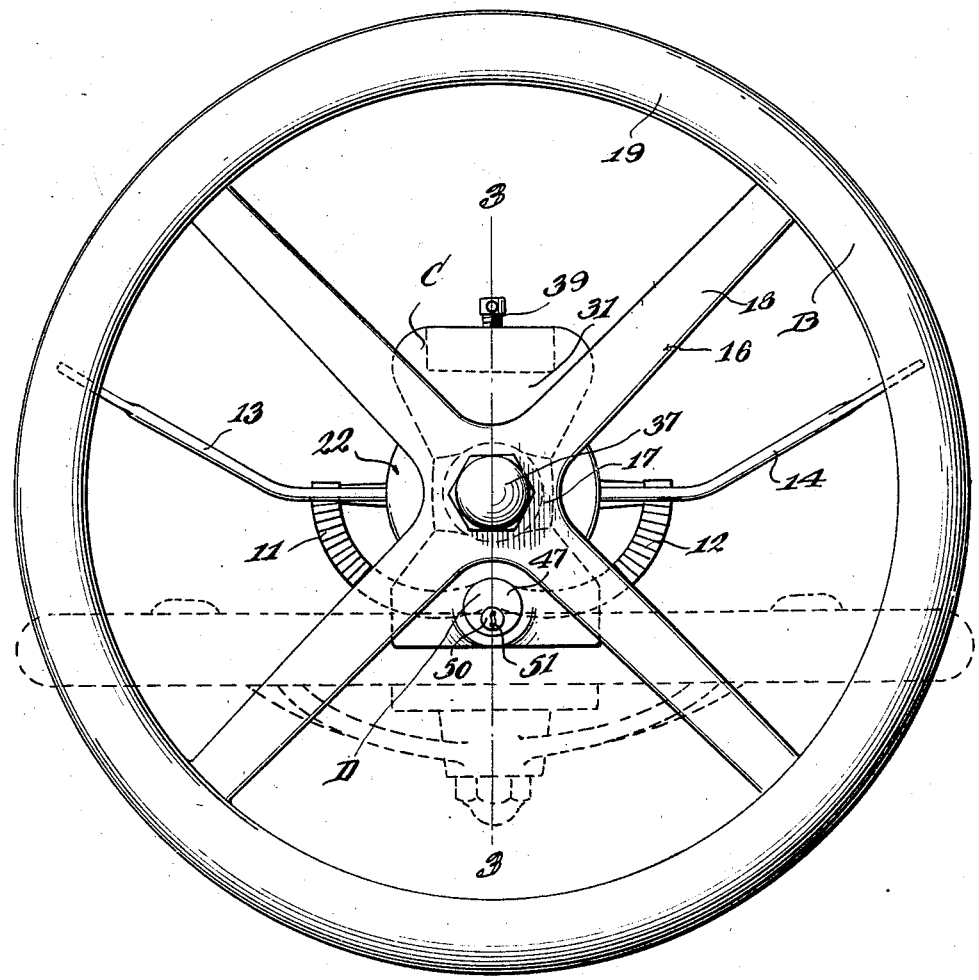
Figure 1 is a plan view of a steering wheel and column showing the improved attachment connected thereto.

The steering column A and steering wheel B are of an ordinary type, utilized in a large number of motor vehicles now on the market, and the improved attachment is particularly adaptable for use in connection therewith, although it is to be understood that the device is applicable to other types of steering wheels and columns. As shown the steering column A includes the outer stationary shell 10, which can be secured in any preferred manner to the motor vehicle and the shell has connected thereto in the usual way the spark quadrant 11 and the throttle quadrant 12. The shell 10 also supports the spark lever 13 and the throttle lever 14, which are movable over the faces of the quadrants 11 and 12. The shell 10 has rotatably mounted therein the steering post or rod 15, to which is ordinarily attached, by suitable keys and cap nut the wheel B. In this instance, however, the improved attachment is utilized for connecting the wheel B, with the steering rod or post, so as to permit the steering wheel to be tilted and locked against movement.

The steering wheel B includes the spider 16 having the axial boss 17 and the radially extending arms 18, to which is attached the rim 19. The boss 17 has a recess machined therein for usually receiving the upper end of the post or rod 15, but in this instance, the recess receives the stud 20 which form a portion of the attachment C which will now be described.

The improved attachment C includes a pair of plates 21 and 22, which may be made of any preferred metal, such as aluminum, brass or the like, either cast in the desired form, or cut to the desired form. The inner or lower plate or casting 21 includes a boss 22' adapted to receive the rod or post 15. The outer end of the post or rod 15 is upset as at 23, so as to prevent the unauthorized removal of the plate from the post, and in order to prevent rotation of the plate on the post or rod, suitable keys or feathers 24 are utilized. The forward end of the boss 22' has formed thereon an outwardly extending arm 25, which is provided with a relatively broad inwardly extending notch 26. The rear end of the boss 22 has formed thereon the rearwardly extending arm 27 which is bifurcated as at 28 to define pivot ears 29. Arranged between the pivot ears 29 is a rearwardly extending tongue 30 which is also formed integral with the plate 21.

The upper or outer plate 22 includes the rectangular shaped body 31, the forward end of which is provided with the depending foot 32 which is adapted to be positioned in the notch 26 when the plates 21 and 22 are arranged in abutting relation. The rear end of the body 31 has formed thereon the inwardly extending or depending foot 33, which is adapted to be positioned between the pivot ears 29. The pivot ears 29 are adapted to support the pivot pins 34, which are threaded into the ears 29 and then extended into the foot 33. The terminals of the pivot pins 34 are ground or cut off smooth, so that the same cannot be grasped or rotated by an instrument or tool to effect the disconnection of the plates 21 and 22. The central portion of the body 31 is provided with an axial opening 35 which is in direct alignment with the opening in the boss 22, and this axial opening 35 is adapted to receive the stud 20 heretobefore mentioned. The stud 20 is keyed or otherwise secured to the body 31 and to the hub 17, and the same keys can be utilized for keying the stud to the hub and to the body 31. The inner end of the stud is upset as at 36, while the outer end is reduced and threaded for the reception of the cap nut 37, and if so desired a lock pin 38 may be utilized for preventing turning of the cap nut.

In order to permit the locking of the plates 21 and 22 in their abutting normal positions, a set screw 39 is utilized. This set screw 39 is threaded into the depending foot 32 and has a smooth inner end 40, which is adapted to be moved into engagement with a recess 41 formed in the inner wall of the notched portion 26 of the arm 25. The outer end of the screw 39 may be provided with a winged head, or as shown, with handles 42. It can be seen that the screw can be readily manually operated for moving the smooth end 40 thereof into or out of engagement with the recess 41. When the smooth end 40 of the screw 39 is in the recess 41, swinging or pivoting movement of the plate 22 is prevented, and steering of the vehicle is permitted.

However when the reduced end 40 is moved out of the recess 41, the plate 22 can be readily swung on the pivot pins 34 and moved to a position at right angles to the plate 21. This will position the steering wheel substantially parallel with the column A and the pivot pins 34 are located at such a point that when the steering wheel is swung to its inoperative position, the wheel will be in engagement with the spark and throttle quadrants 11 and 12. Thus it can be seen that when the steering wheel is swung to its inoperative position not only is free access permitted to the driver's seat, but that turning movement of the steering wheel around the column A is prevented.

As the steering wheel is in intimate engagement with the spark and throttle quadrants 11 and 12, movement of the spark and throttle levers 13 and 14 is also prevented, and thus actuation of the vehicle motor is prevented. It can be seen, however, that a slight movement of the spark and throttle levers is permitted, but this movement is insufficient to allow a complete control of the engine.

In order to hold the plate 22 at right angles to the plate 21, and the steering wheel C in its inoperative position against operation by unauthorized persons a lock mechanism D is provided.

This locking mechanism includes an ordinary pin tumbler mechanism 45 carried by the rear end of the body 31 and the locking bolt mechanism 46, which is carried by the rear end of the arm 27 of the plate 21.

The pin tumbler mechanism 45, as stated, is of the usual or any preferred construction, and as shown includes the shell 47 which is mounted against movement by pins 48, in an inwardly extending recess 49 formed in the upper surface of the body 31 of the plate 22 adjacent to its rear edge and directly above the depending leg 33. The shell 47 receives the ordinary revoluble plug 50, which is provided with the key way 51, for a key 52. The key 52 is adapted to actuate the usual pin tumblers and their complement drivers (not shown). The inner end of the plug 50 carries a cam 53, which is adapted to actuate the driver 54 for the bolt mechanism 46. The driver 54 is of substantially cylindrical form and is provided with a conical inner end for engagement with the cam 53. The driver 54 is slidably mounted within a bore 55 formed in the depending leg 33 and this bore communicates with the recess 49, and is adapted to be moved into alignment with the inwardly extending way 56 formed in the tongue 30 when the plate 22 is moved to its inoperative position at right angles to the plate 21. The sliding movement of the driver 54 is limited by means of a cross pin 57, which engages in a suitable guide way formed in the driver. The bolt mechanism 46 includes a cylindrical body 58, and this body is normally urged outwardly of the way 56, by means of an expansion coil spring 59. The movement of the body 58 within the way 56 is also limited, by means of a suitable pin 59. It can be seen that when the cam 53 is moved by the key 52 in a position as shown in Figure 4, i. e., when the lower point of the cam is in alignment with the driver 54, the bolt will be moved under the influence of the spring 59 into the bore 55. This will absolutely prevent movement of the plate 22 on the pivot pins 34, and thus the plate 22 and the steering wheel B is held against movement. It can be seen, however that when the cam 53 is moved so that the highest point thereof will be in alignment with the driver 54, the driver 54 will be moved in the bore 55, which will push the bolt in the way 56, and out of the bore 55. This will permit the free swinging of the plate 22 on the pivot pins 34 and thus permit the plate to be moved into abutting engagement with the plate 21, which will move the steering wheel B to its normal position.

From the foregoing description, it is believed that the operation of the improved attachment will be clear, but a further description of the operation is here offered. When the driver of a vehicle desires to leave his seat and park his vehicle, the screw 39 is operated, so as to move the smooth end 40 thereof from out of engagement with the recess 41. The driver then grasps the steering wheel B and swings the same and the plate 22 on the pivot pins 34. This positions the steering wheel substantially parallel with the steering column A and free movement of the driver from or to the driver's seat is permitted. The key 52 is then inserted in the plug 50 and the plug is turned, so as to position the lowest end of the cam 53 in engagement with the driver 54, which will permit the bolt to ride into the way 55. The key is then removed and return movement of the steering wheel to its normal position is absolutely precluded. As heretobefore stated, the steering wheel is moved into intimate engagement with the quadrants 11 and 12, which prevents turning movement of the steering wheel around the column. Thus unauthorized movement of the steering wheel is eliminated.

When the driver of the vehicle returns to his seat and desires to operate the vehicle, the key 52 is reinserted in the plug and the same turned, so as to move the highest point of the cam 53 in engagement with the driver 54 which will force the bolt 46 out of the way 55, and the driver then swings the wheel B and the plate 22 to their normal positions, after which the screw 39 is turned, so as to move the smooth end 40 into engagement with the wall of the recess 41. The steering gear is then ready for use in the ordinary manner, and accidental swinging movement of the plate 22 on the pivot pins 34 is prevented by the screw 39.

From the foregoing, it can be seen that an exceptionally simple and durable attachment has been provided, which not only permits the steering wheel to be tilted so that convenient access can be had to the driver's seat, but which also serves as a lock for the vehicle, so as to prevent the theft thereof by unscrupulous persons.

Changes in details may be made without departing from the spirit or scope of this invention; but,

I claim:

1. In a steering device, the combination with a steering post and a steering wheel, a shell for rotatably receiving said post, spark and throttle levers rotatably carried by the shell, and quadrants for said levers, of an attachment interposed between the steering wheel and post, including a pair of plates adapted for connection respectively with the steering post and the steering wheel, means hingedly connecting the plates together adjacent to one end and above said quadrants, whereby the plates can be swung in relation to each other and the wheel in relation to the post and in engagement with the quadrant, the wheel when swung in engagement with the quadrant, lying in the path of the levers whereby actuation thereof is prevented, and locking means carried by the plates for holding said plates against movement when the plates are swung in relation to each other.

2. In a steering device, the combination with a steering post and steering wheel, a shell for receiving said post. spark and throttle levers rotatably carried by said shell, and quadrants for said levers, of an attachment interposed between the wheel and steering post including a pair of superimposed plates, means hingedly connecting the plates together at one end, a releasable locking member carried by the opposite ends of the plates for preventing accidental movement of the plates in relation to each other, the hinged plates permitting the steering wheel to be swung in engagement with the quadrants and in the path of the spark and throttle levers, and a key operated lock for holding the plates against swinging movement by unauthorized persons when the plates are moved in relation to each other.

3. As a new article of manufacture, an attachment for steering mechanisms of motor vehicles comprising a pair of superposed plates, means hingedly connecting the plates together at one of their ends, whereby the plates can be swung at an angle in relation to each other, one of the plates having an opening for the reception of a steering post of the steering mechanism, an outwardly extending stud rigidly carried by the other plate for receiving the steering wheel of the steering mechanism, and a key operated lock carried by the plates adjacent to the point of their connection for holding the plates in their angularly related positions.

4. As a new article of manufacture, an attachment for steering mechanisms comprising a pair of abutting plates, means hingedly connecting the plates together at one of their ends, one of the plates having an opening for receiving the steering post of the steering mechanism, an outwardly extending rigid stud carried by the other plate for receiving the steering wheel of the steering mechanism, a releasable locking member carried by one end of the plates for holding the plates against accidental swinging movement, and a spring pressed bolt carried by one plate for holding the plates against actuation when the plates are swung to one of their adjusted positions.

5. As a new article of manufacture, an attachment for the steering mechanism of motor vehicles including an inner plate, an outer plate, means hingedly connecting the plates together at one of their ends, the inner plate having an opening for receiving the steering post of the steering mechanism, an outwardly extending stud carried by the outer plate for receiving the steering wheel of the steering mechanism, said outer plate having a transverse way formed therein, the inner plate having a longitudinally extending way adapted to align with the transverse way when the outer plate is swung on the pivot to a position at substantially right angles to the inner plate, a bolt slidably mounted in the longitudinally extending way adapted for movement in the transverse way, a driver slidably mounted in the transverse way, and a key operated cam for operating said driver.

6. An attachment for the steering mechanism of motor vehicles comprising an inner plate having a notched portion at one end, and a pair of pivot lugs at the opposite end, an outer plate including a pair of depending lugs, one of the lugs being adapted to be received in said notched portion, and the other lug between the pivot lugs, pivot pins connecting the last mentioned lug with the pivot lugs, a screw carried by the first mentioned lug for engagement with the inner plate, the inner plate having an opening for receiving the steering post of the steering mechanism, an outwardly extending stud carried by the outer plate for receiving the steering wheel of the steering mechanism, the inner plate having a longitudinally extending way, the outer plate having a transversely extending way adapted to align with the longitudinally extending way when the outer plate is swung at right angles to the inner plate, a spring pressed bolt slidably mounted in the longitudinal way adapted for movement into the transverse way, a driver slidably mounted in the transverse way, and a key operated cam carried by the outer plate for actuating said driver.

ROBERT S. BUSBY.